(12) United States Patent
Kalandar et al.

(10) Patent No.: US 9,476,788 B2
(45) Date of Patent: Oct. 25, 2016

(54) SEMICONDUCTOR SENSOR WITH GEL FILLED CAVITY

(71) Applicants: Navas Khan Oratti Kalandar, Petaling Jaya (MY); Charles Bergere, Shah Alam (MY)

(72) Inventors: Navas Khan Oratti Kalandar, Petaling Jaya (MY); Charles Bergere, Shah Alam (MY)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 181 days.

(21) Appl. No.: 14/258,024

(22) Filed: Apr. 22, 2014

(65) Prior Publication Data

US 2015/0300905 A1    Oct. 22, 2015

(51) Int. Cl.
G01L 9/00 (2006.01)
G01L 9/16 (2006.01)
G01L 19/06 (2006.01)

(52) U.S. Cl.
CPC .................................. G01L 19/0618 (2013.01)

(58) Field of Classification Search
CPC ........ G01L 21/04; G01L 19/14; G01L 19/06
USPC .......................................................... 73/754
See application file for complete search history.

(56) References Cited

U.S. PATENT DOCUMENTS

| 4,920,972 | A | 5/1990 | Frank et al. |
| 5,266,827 | A | 11/1993 | Kato |
| 5,357,673 | A | 10/1994 | Polak et al. |
| 6,020,219 | A | 2/2000 | Dudderar et al. |
| 6,393,922 | B1 * | 5/2002 | Winterer ............. G01L 19/0084 73/754 |
| 6,740,972 | B2 | 5/2004 | Smith et al. |
| 6,844,632 | B2 | 1/2005 | Shiono et al. |
| 7,145,253 | B1 | 12/2006 | Kim et al. |
| 7,956,451 | B2 | 6/2011 | Carberry et al. |
| 8,297,127 | B2 | 10/2012 | Wade et al. |
| 8,378,435 | B2 | 2/2013 | Lo et al. |
| 2007/0028699 | A1 | 2/2007 | Chen et al. |
| 2010/0289055 | A1 | 11/2010 | Tan et al. |
| 2011/0240212 | A1 | 10/2011 | McMahan |
| 2012/0104583 | A1 | 5/2012 | Lee et al. |
| 2012/0306031 | A1 | 12/2012 | Lo et al. |
| 2014/0110801 | A1 * | 4/2014 | Higgins, III ........ G01L 19/0069 257/417 |
| 2015/0014793 | A1 * | 1/2015 | Yow et al. .............. H01L 29/84 257/415 |

* cited by examiner

*Primary Examiner* — Lisa Caputo
*Assistant Examiner* — Roger Hernandez-Prewit
(74) *Attorney, Agent, or Firm* — Charles E. Bergere

(57) ABSTRACT

A pressure sensor has a housing having a bottom surface and side walls that form a cavity. A pressure sensor die is attached to the bottom of the cavity and covered with a layer of low modulus gel. A lid is secured to upper ends of the side walls and covers the cavity, gel and pressure sensor die. The lid has an inner surface facing the gel and an exposed outer surface, and includes protrusions extending from the inner surface along the side walls and towards the gel such that the gel near the upper ends of the side walls is displaced towards a central region of the cavity to ensure that the gel completely covers the pressure sensor die.

19 Claims, 2 Drawing Sheets

SEMICONDUCTOR SENSOR WITH GEL FILLED CAVITY

CROSS-REFERENCE TO RELATED APPLICATIONS

This application is related to U.S. patent application Ser. No. 13/657,250 of Leo Higgins, III filed on Oct. 22, 2012 and assigned to Freescale Semiconductor, Inc.

BACKGROUND OF THE INVENTION

The present invention relates generally to semiconductor pressure sensor devices, and, more particularly, to a pressure sensor device with a gel filled cavity.

For certain semiconductor devices, such as those that include pressure sensing dies, it is known to apply a pressure-sensitive gel over the pressure sensing die to protect the die while still allowing the die to sense the atmospheric pressure outside of the package.

In some package designs having one or more dies, the dies are placed in a cavity. The gel fills the cavity so that it covers all of the dies as well as any bond wires used to connect the dies to one another and/or to device leads. Unfortunately, due to the surface tension of the gel, when the gel is dispensed into the cavity, the gel adheres to the sides of the cavity and a meniscus is formed such that the top surface of the gel has a concave shape.

FIG. 1 shows a cross-sectional side view of a conventional semiconductor sensor device 10. The sensor device 10 includes a control unit die 12 and a pressure sensor die 14 disposed in a housing. The housing is formed by a lead frame flag 16 upon which the dies 12 and 14 are mounted, lead frame leads or lead fingers 18, and side walls 20. The pressure sensor die 14 is connected to the control unit die 12 with first bond wires 22 and the control unit die 12 is connected to the lead fingers 16 with second bond wires 24. The flag 16, lead fingers 18 and side walls 20 of the housing form a cavity 26 within which the dies 12 and 14 are located. The cavity 26 is partially filled with a gel 28 that covers the dies 12 and 14 and the bond wires 22 and 24, but enables the air/gas pressure surrounding the device 10 to reach the pressure-sensitive active region on the top side of the pressure sensor die 14. The gel 28 protects the dies 12 and 14 and the bond wires 22, 24 from mechanical and environmental damage. The cavity 26 is covered by a lid 30, which has a vent hole 32 that exposes the gel-covered pressure sensor die 14 to ambient atmospheric pressure outside the sensor device 10.

As previously discussed, the gel 28 dispensed into the cavity 26 adheres to the side walls 20 of the cavity 26 and a meniscus is formed such that the top surface of the gel 28 has a concave shape depending on the gel surface tension and cavity side wall roughness. If the curvature of the upper surface becomes too great, then portions of the first bond wires 22 (and possibly even portions of the dies 12 and 14, the second bond wires 24) may become exposed to the ambient atmosphere above the gel 28 as shown in FIG. 1. Exposure of the bond wires 22 and the dies 12, 14 to the ambient atmosphere can result in environmental damage (e.g., contamination and/or corrosion) to the sensor device 10. Accordingly, it would be advantageous to have a structure and process that ensures the bond wires are fully covered with gel.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, the present invention is a pressure sensor including a housing having a bottom surface and side walls that form a cavity. A pressure sensor die is attached to the bottom of the cavity. A layer of gel is disposed over the pressure sensor die, and a lid is secured to upper ends of the side walls. The lid covers the cavity, gel and pressure sensor die. The lid has an inner surface facing the gel and an exposed outer surface, and protrusions extending from the inner surface along the side walls and towards the gel such that the gel near the upper ends of the side walls is displaced towards a central region of the cavity. The lid does not have any protrusions in a central area, rather just the protrusions along the side walls.

Figure 1:
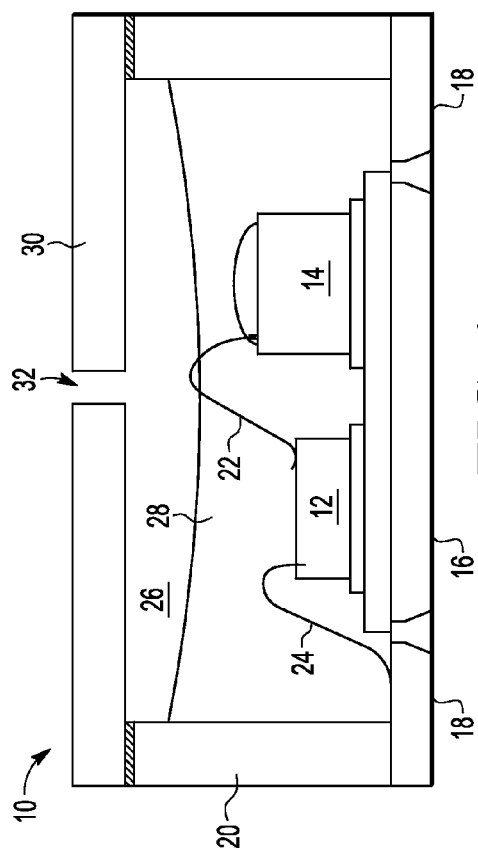
FIG. 1 is a cross-sectional view a conventional pressure sensor device.
Figure 2B:
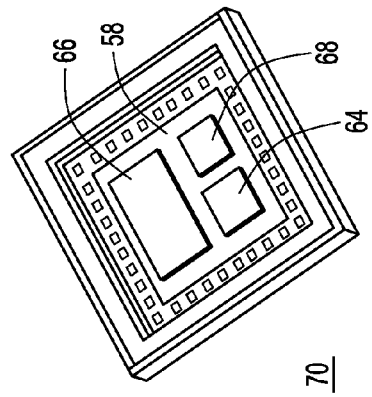
FIG. 2B is a top, perspective view of a partially assembled pressure sensor device in accordance with an embodiment of the present invention.
Figure 2A:
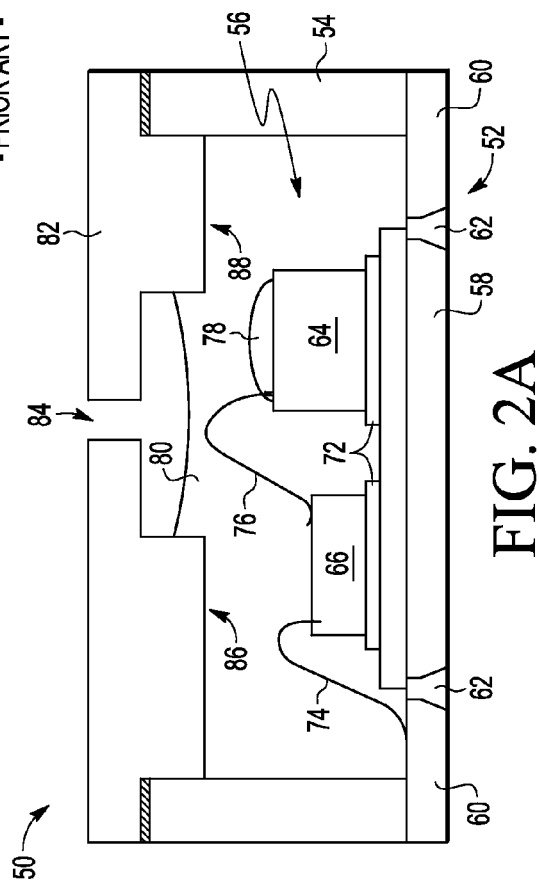
FIG. 2A is a cross-sectional view of a pressure sensor device in accordance with a first embodiment of the present invention.

Referring now to FIG. 2A, a side cross-sectional view of a pressure sensor 50 including a housing having a bottom surface 52 and side walls 54 that form a cavity 56 is shown. In one embodiment, the bottom surface 52 of the housing comprises a lead frame flag 58 and lead fingers 60 from which the side walls 54 extend vertically upward. That is, the side walls 54 are generally perpendicular to the lead frame flag 58 and lead fingers 60. In a preferred embodiment, a plastic material 62 such as a mold compound is disposed between the lead frame flag 58 and the lead fingers 60. The plastic material 62 may or may not cover a top surface of the die flag 58. The side walls 54 are formed by injection molding or using a pre-molded frame and made of epoxy resin.

A pressure sensor die 64 is attached to the bottom of the cavity 56. More particularly, the pressure sensor die 64 is mounted on and attached to the top surface of the die flag 58. In one embodiment, a control die 66 also is mounted on and attached to the top surface of the die flag 58 and located adjacent to the pressure sensor die 64. The dies 64 and 66 may be attached to the die flag 58 with an adhesive 72.

Also, as shown in FIG. 2B, which is a top plan view of a partially assembled pressure sensor device 70 in accordance with another embodiment of the present invention, the device 70 may have a pressure sensor die 64, a control die 66, and another sensor die 68, such as an acceleration sensor. In the embodiment shown in FIG. 2B, the three dies 64, 66 and 68 are all mounted on the die flag 58. The dies 64, 66 and 68 may be attached to the flag 58 with an adhesive (such as the adhesive 72 shown in FIG. 2A), which may be an epoxy or adhesive tape, as are known in the art.

The pressure sensor die 64, which may be a P-cell, is designed to sense pressure of the surrounding environment, while in one embodiment, the other sensor die 68 comprises a G-cell that is designed to sense gravity or acceleration in one, two, or all three axes, depending on the particular implementation. The control die 66 controls, for example, the operations of and the processing of signals generated by the P-cell and the G-cell. The P-cell 64, G-cell 68, and the control die 66 are well-known components of semiconductor sensor devices and thus detailed descriptions thereof are not necessary for a complete understanding of the present invention.

Referring again to FIG. 2A, the control die 66 is electrically connected to the lead fingers 60 with first bond wires 74, while the pressure sensor die 64 is electrically connected to bond pads (not shown) on an active surface of the control die 66 with second bond wires 76. The first and second bond wires 74 and 76 may comprise copper, gold or aluminum and may be plated or unplated, as is known in the art. In one embodiment, a gel cap 78 comprising a thin layer of a first epoxy material is disposed over the pressure sensor die 64 and subjected to curing. The gel cap 78 may comprise liquid epoxy applied by dispensing using a needle or by printing.

The cavity 56 is filled with a second gel material 80, which is meant to cover the pressure sensor die 64 to protect it from environmental damage. The second gel material 80 preferably also covers the control die 66 and the first and second bond wires 74 and 76. The second gel material 80 is applied using, for example, a nozzle of a conventional dispensing machine (not shown), as is known in the art. After dispensing, the second gel material 80 preferably is cured by, for example, placing the assembly in an oven.

A lid 82 having a central hole or air vent 84 is secured to upper ends of the side walls 54 and secures the second gel material 80 within the cavity 56. The lid 82 has an inner surface facing the second gel material 80 and an exposed outer surface. The lid 82 also has protrusions 86 and 88 that extend from the lid inner surface along the side walls 54 and towards the second gel material 80 such that the gel near the upper ends of the side walls 54 is displaced towards a central region of the cavity 56 (and a central area of the lid 82). The displacement of the second gel material 80 from the upper ends of the side walls 44 ensures that the second gel material 80 completely covers the pressure sensor die 64 and the second bond wires 76, yet the second gel material 80 is not displaced so much that it will impede the flow of air through the air vent 84. There also is an air gap between the lid 82 and the second gel material 80 to allow changes in pressure outside of the device 50 to be sensed by the device 50.

The outer ends of the lid 82 may be attached to an upper surface of the side walls 54 with an adhesive material such as an epoxy prior to curing the second gel 80, or the lid adhesive and second gel 80 may be cured simultaneously The protrusions 86 and 88 of the lid 82 need not be symmetrical. For example, in the embodiment of FIG. 2A, the protrusion 86 over the control die 66 is wider than the protrusion 88 that is partially over the pressure sensor die 64. According to the present invention, in cross-section, there are just two protrusions 86, 88 and the hole 84 in the lid 82 is located in a central area of the lid 82 between the protrusions 86 and 88.

The protrusions 86, 88 may be integrated with the lid 82 using a fabrication process such as casting, injection molding, or machining. The lid 82 and the protrusions 86, 88 may be made from metal, engineering plastics such as thermoplastic polymers, liquid crystal polymers, epoxy or other suitable material. The protrusions 86, 88 can have a round, square, rectangular, or other suitable shape and size that enables them to displace the second gel material 80 from the side wall areas of the cavity 56.

Figure 3:
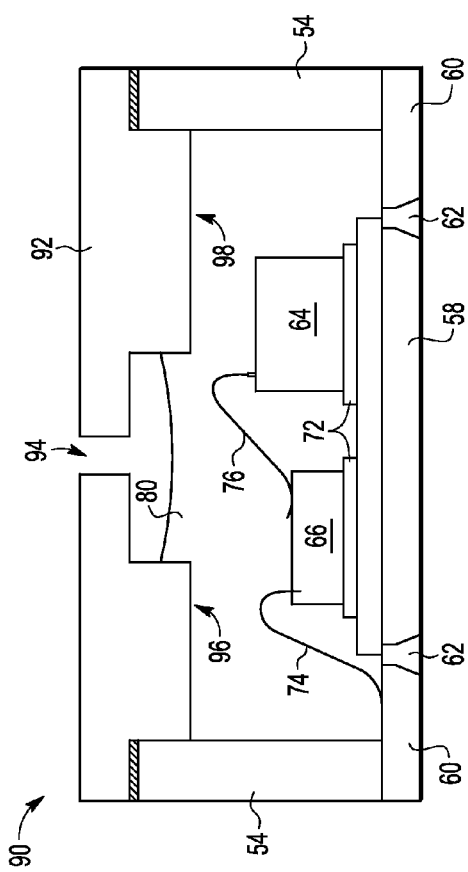
FIG. 3 is a cross-sectional view of a pressure sensor device in accordance with a second embodiment of the present invention.

Referring now to FIG. 3, a cross-sectional view of a pressure sensor device 90 in accordance with a second embodiment of the present invention is shown. Since the device 90 is similar to the device 50, only the differences will be explained. The device 90 has a lid 92 having an air vent or hole 94 and protrusions 96 and 98. In this embodiment, the protrusion 98 extends further over the pressure sensor die 64 than the protrusion 88 shown in FIG. 2A. Also, the protrusion 96 over the control die 66 is not as wide as that of the device 50. Changing the widths of the protrusions 96, 98 shifts the central region of the lid 92 such that the hole 94 is more centrally located than the hole 84 of the lid 82.

Figure 4:
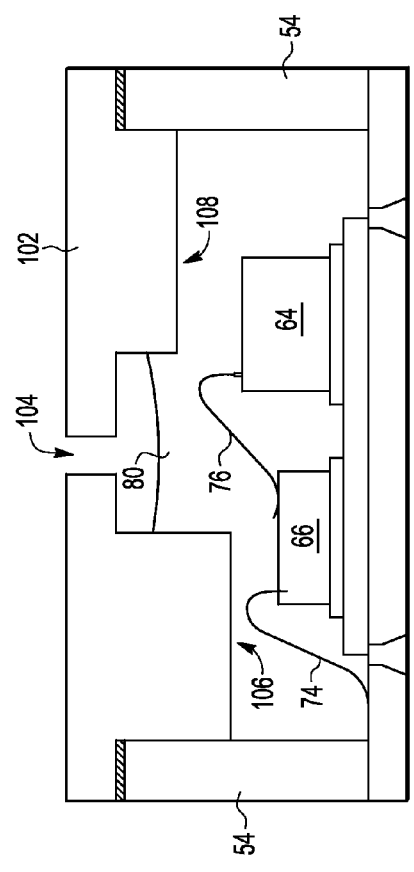
FIG. 4 is a cross-sectional view of a pressure sensor device in accordance with a third embodiment of the present invention.

FIG. 4 is a cross-sectional view of a pressure sensor device 100 in accordance with yet another embodiment of the present invention. Since the device 100 is similar to the devices 50 and 90, only the differences will be explained. The device 100 has a lid 102 having an air vent or hole 104 and protrusions 106 and 108. In this embodiment, the protrusion 106 extends further into the cavity than the protrusion 108. That is, since the control die 66 is thinner than the pressure sensor die 64, that height difference is exploited by allowing the protrusion 106 to extend further into the cavity yet still allow for sufficient clearance so as not to contact the bond wires 74. This embodiment further ensures that the second gel material 80 is displaced such that it covers the pressure sensor die 64 and the bond wires 76.

By now it should be appreciated that the present invention provides a pressure sensor having a housing having a cavity, a pressure sensing die attached to a bottom of the cavity, a layer of gel over the pressure sensing die, and a lid over the cavity. The lid has protrusions that extend along the side walls of the cavity and displace the gel from the sides of the cavity to ensure that the gel covers the pressure sensing die and any bond wires that electrically connect the pressure sensor die to a control die or package terminals. The lid also has a central area that does not include any projections and has an air vent or hole therein. The protrusions are arranged to extend along the side walls of the housing to displace the gel yet still leave an air gap between the gel and the air vent so that the gel will not impede the flow of air through the hole.

The terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein. Unless stated otherwise, terms such as "first" and "second" are used to arbitrarily distinguish between the elements such terms describe. Thus, these terms are not necessarily intended to indicate temporal or other prioritization of such elements.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Although the disclosure is described herein with reference to specific embodiments, various modifications and changes can be made without departing from the scope of the present disclosure as set forth in the claims below, such as substituting a substrate for the lead frame or forming the side walls and lid of different materials. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The invention claimed is:

1. A pressure sensor, comprising:
   a housing having a bottom surface and side walls that form a cavity;
   a pressure sensor die attached to the bottom of the cavity;
   a layer of gel over the pressure sensor die; and
   a lid secured to upper ends of the side walls and covering the cavity, gel and pressure sensor die, wherein the lid has an inner surface facing the gel and an exposed outer surface, and wherein the lid further comprises:
      protrusions extending from the inner surface along the side walls and towards the gel, wherein the gel near the upper ends of the side walls is displaced towards a central region of the cavity.

2. The pressure sensor of claim 1, wherein a central area of the lid does not have any protrusions.

3. The pressure sensor of claim 2, wherein the central area of the lid has a hole therein.

4. The pressure sensor of claim 2, wherein the displacement of the gel material from the upper ends of the side walls ensures that the gel material completely covers the pressure sensor die.

5. The pressure sensor of claim 2, the bottom surface of the housing comprises a lead frame flag upon which the pressure sensor die is attached and lead fingers from which the side walls extend.

6. The pressure sensor of claim 5, further comprising a plastic material disposed between the lead frame flag and the lead fingers.

7. The pressure sensor of claim 2, further comprising a control unit die attached to the bottom surface of the cavity and electrically connected to the pressure sensor die.

8. The pressure sensor of claim 7, wherein the control die is located adjacent to the pressure sensor die.

9. The pressure sensor of claim 8, further comprising bond wires that electrically connect the pressure sensor die to the control unit die, wherein the protrusions displace the gel to ensure that the gel covers the bond wires.

10. The pressure sensor of claim 7, further comprising an acceleration sensor die disposed within the cavity and in communication with the control unit die.

11. The pressure sensor of claim 2, wherein the outer ends of the lid are attached to an upper surface of the side wall with an adhesive material.

12. The pressure sensor of claim 2, wherein one of the protrusions is longer than the other protrusions.

13. A pressure sensor, comprising:
   a housing having a bottom surface and side walls that form a cavity;
   a pressure sensor die attached to the bottom of the cavity;
   a layer of gel over the pressure sensor die; and
   a lid secured to upper ends of the side walls and covering the cavity, gel and pressure sensor die, wherein the lid has an inner surface facing the gel and an exposed outer surface, and wherein the lid further comprises:
      protrusions extending from the inner surface along the side walls and towards the gel, wherein the gel near the upper ends of the side walls is displaced towards a central region of the cavity; and wherein a central area of the lid does not have any protrusions, and the central area of the lid has a hole therein.

14. The pressure sensor of claim 13, wherein the displacement of the gel material from the upper ends of the side walls ensures that the gel material completely covers the pressure sensor die.

15. The pressure sensor of claim 13, the bottom surface of the housing comprises a lead frame flag upon which the pressure sensor die is attached and lead fingers from which the side walls extend.

16. The pressure sensor of claim 15, further comprising a plastic material disposed between the lead frame flag and the lead fingers.

17. The pressure sensor of claim 13, further comprising a control unit die attached to the bottom surface of the cavity and electrically connected to the pressure sensor die.

18. The pressure sensor of claim 17, wherein the control die is located adjacent to the pressure sensor die and one of the protrusions extends at least partially over the control unit, wherein said protrusion is longer than the other protrusions.

19. The pressure sensor of claim 18, further comprising bond wires that electrically connect the pressure sensor die to the control unit die, wherein the protrusions displace the gel to ensure that the gel covers the bond wires.

* * * * *